United States Patent [19]

Rudolph

[11] Patent Number: 4,669,687
[45] Date of Patent: Jun. 2, 1987

[54] AIRFOIL FLAP MEMBER WITH FLAP TRACK MEMBER

[75] Inventor: Peter K. C. Rudolph, Seattle, Wash.
[73] Assignee: The Boeing Company, Seattle, Wash.
[21] Appl. No.: 708,670
[22] Filed: Mar. 6, 1985
[51] Int. Cl.⁴ .............................................. B64C 3/50
[52] U.S. Cl. .................................. 244/215; 244/212; 244/213; 244/216
[58] Field of Search ............... 244/216, 212, 213, 215

[56] References Cited

U.S. PATENT DOCUMENTS

| | | | |
|---|---|---|---|
| 4,353,517 | 10/1982 | Rudolph | 244/216 |
| 4,381,093 | 4/1983 | Rudolph | 244/216 |
| 4,434,959 | 3/1984 | Rudolph | 244/216 |
| 4,471,927 | 9/1984 | Rudolph | 244/216 |

Primary Examiner—Donald P. Walsh
Attorney, Agent, or Firm—Hughes & Cassidy

[57] ABSTRACT

An airfoil having a trailing edge flap assembly comprising a flap member having a pair of tracks mounted thereto at spanwise spaced locations. Each track member is operatively connected to a slide member which is in turn mounted to a stationary structure. The flap member is attached to the two track members by means of pivotal links and ball joint connections to alleviate problems relating to wing deflection and also differences in linear movement of the flap member due to conical movement from the stowed to the deployed positions. Other embodiments show specific features relating to the actuating means, the track location, and the slide member location.

29 Claims, 15 Drawing Figures

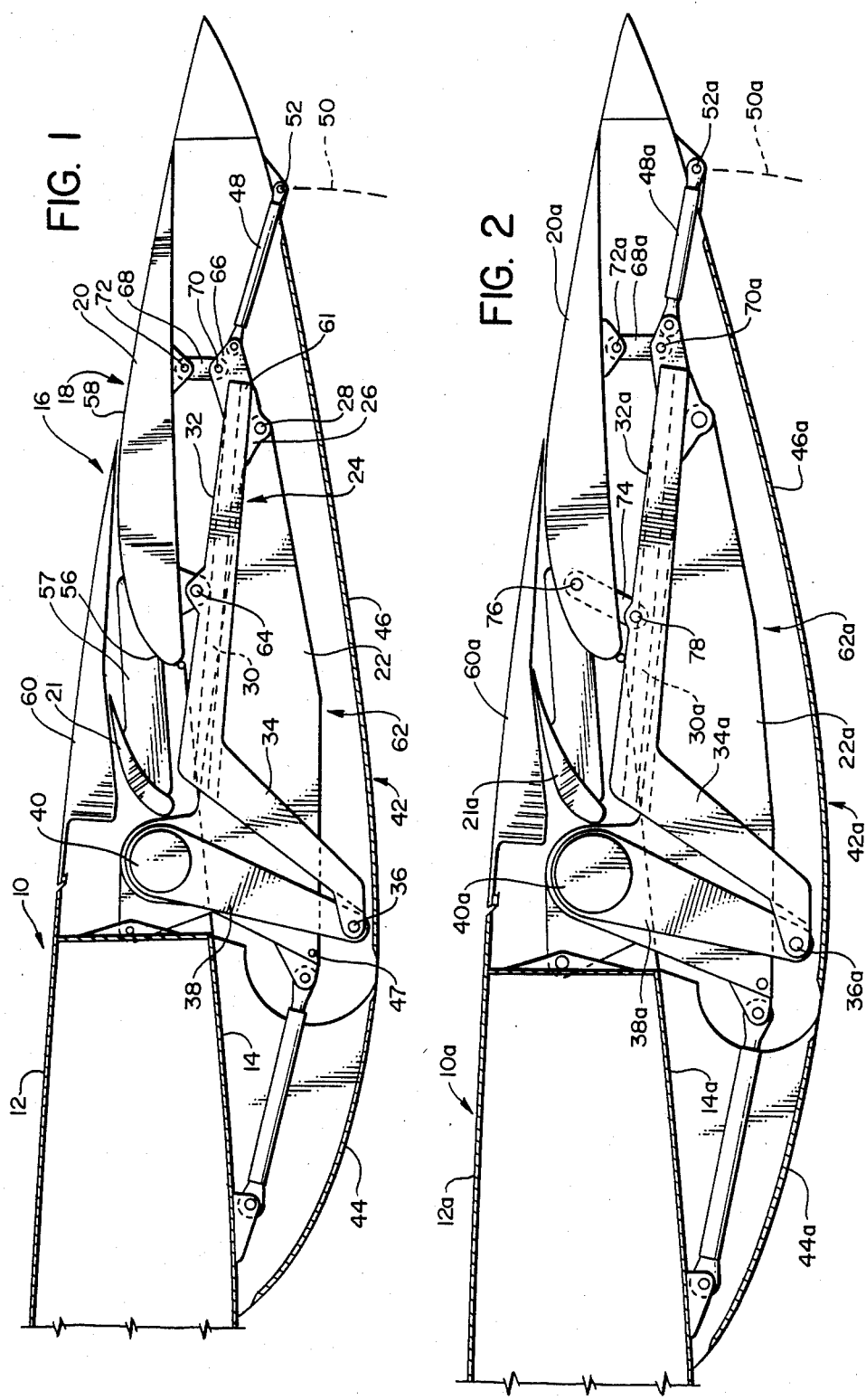

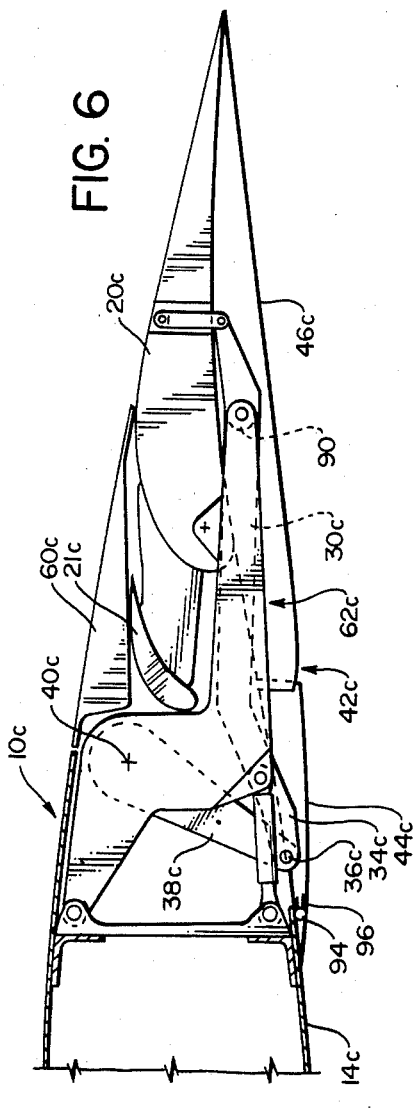
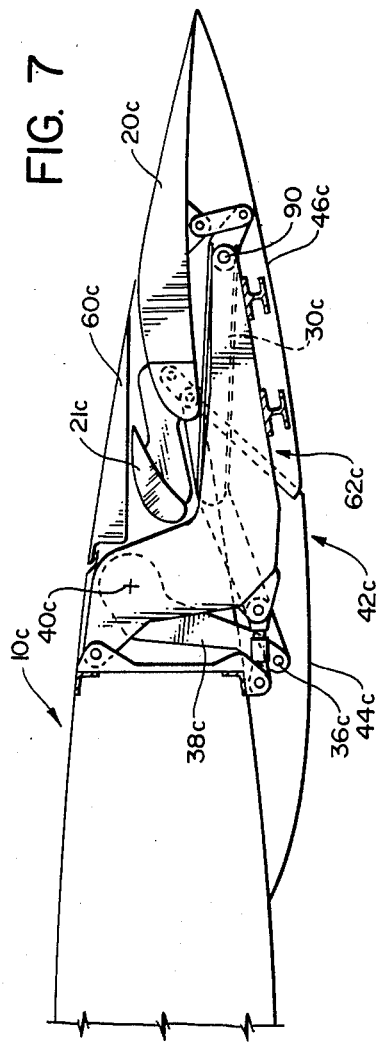

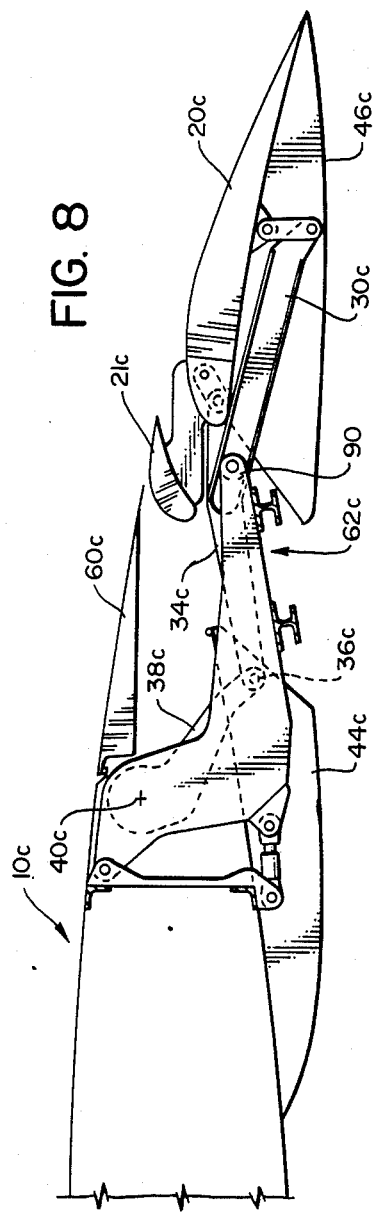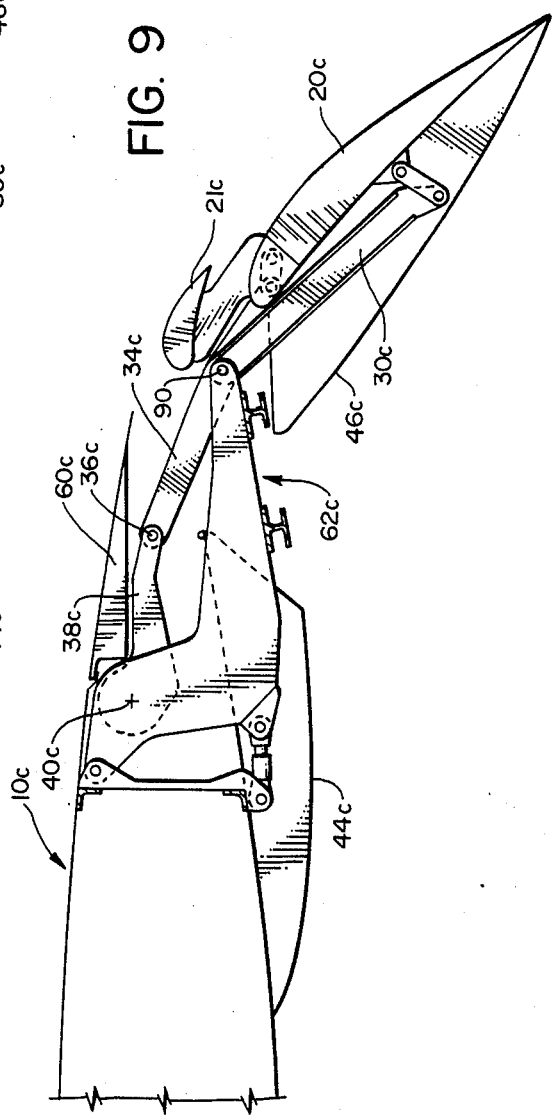

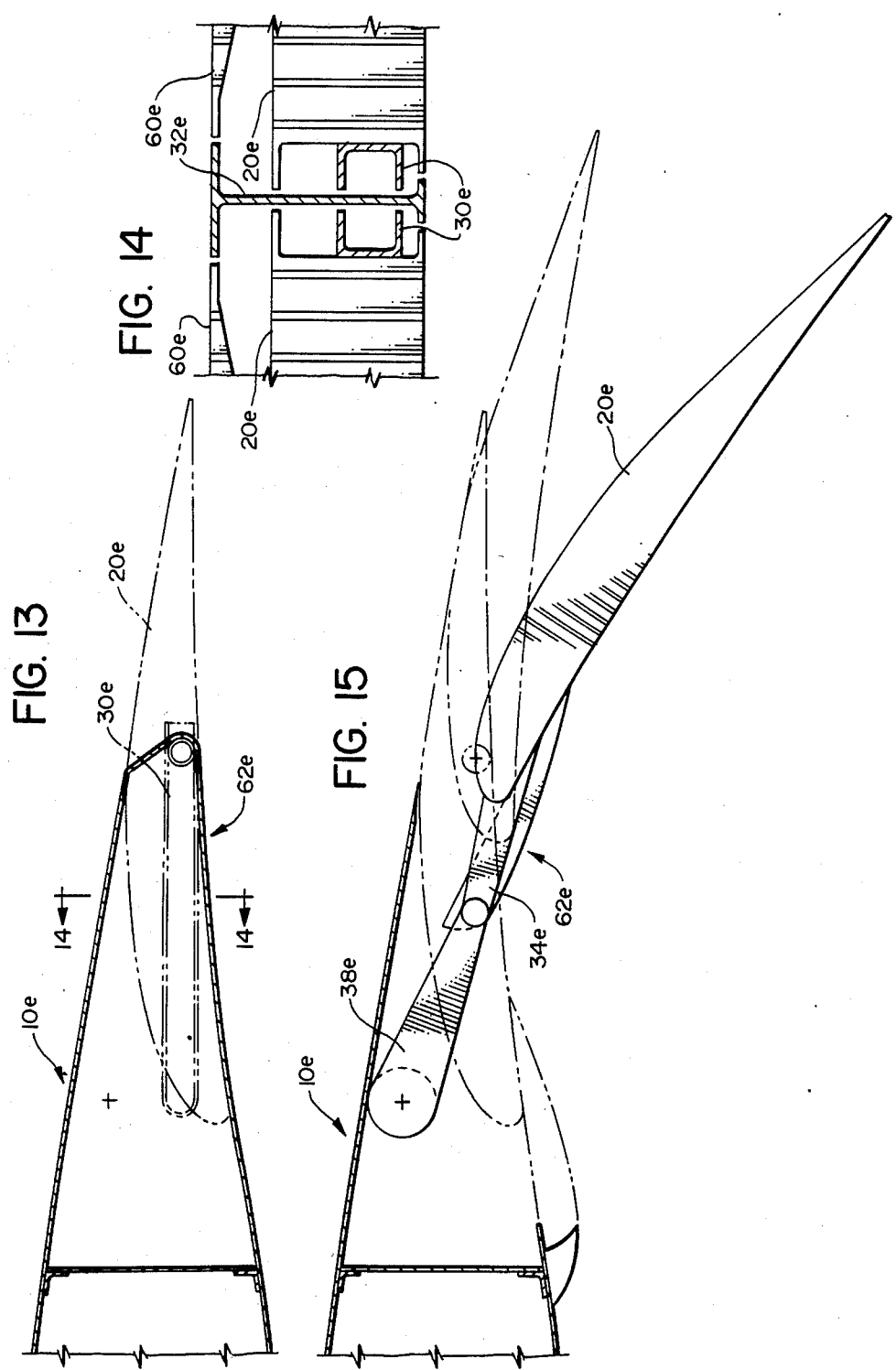

AIRFOIL FLAP MEMBER WITH FLAP TRACK MEMBER

DESCRIPTION

1. Technical Field

The present invention relates to a flap assembly adapted for use as a trailing edge flap of a wing of an airplane.

2. Backoround Art

The trailing edge flaps of a high performance airplane have to perform two functions, namely (a) to provide a high lift-to-drag ratio take-off configuration, and (b) to provide a high lift coefficient landing configuration. A high lift-to-drag ratio for take-off can be accomplished by trailing edge flap positions with (a) high Fowler motion (i.e. aft motion which increases wing projected area), (b) a single short and converging slot and, (c) a small flap deflection angle. The high lift coefficient for landing requires (a) high Fowler motion, (b) a short converging slot between the flap and the wing (and two such slots for double slotted flap configuration) and, (c) high flap deflection angles. Theoretically, the best Fowler motion versus flap deflection angle progression would be that the flap would initially move rearwardly with little or no deflection, and at the end of its rearward travel then deflect downwardly for the landing configuration. This can be accomplished with two independent mechanisms, but this is obviously not a practical solution. Therefore, a single flap mechanism that approaches this motion as closely as possible is the most desirable.

The mechanism that guides and drives the flaps from the stowed to the take-off and landing positions is generally located underneath the flaps. To minimize cruise drag, the flap mechanism and the fairing around it should be small. Also, it is desirable that the flap mechanism should be simple and have good wear characteristics. A further desirable feature is to have low flap actuation power requirements. Also, a stowing moment without load reversal is preferable over a deploying load and/or load reversal.

It is quite common for present commercial aircraft to have single, double or triple slotted flaps that travel in curved tracks. While this arrangement does provide for optimum flap positions for take-off and landing, the flap track fairings are quite large, and the flap track supports are heavy and have inherent in-service problems with track wear and jamming. The main problem arises from the line contact of the highly loaded aft roller on the track.

Another arrangement is used where there is a single slotted flap mounted on an overhead four-bar linkage.

Some short to medium range airplanes are equipped with double slotted flaps, mounted from a simple hinge below the wing. This flap configuration is designed to provide very high lift coefficients for landing, with take-off lift coefficient and lift-to-drag ratio not being critical. The fairing around the flap hinge structure is deep and results in a considerable cruise drag penalty. This is of little consequence on a very short mission.

However, there is need for improvement for mission requirements where there is relatively high gross weight, high altitude, and limited runway length in that there should be an adequately high lift-to-drag ratio for take-off. For a mix of mission requirements, short and long range, with high gross weight and intermediate runway length, intermediate gross weight and short field length, a flap system with the aerodynamic characteristics of the track guided flaps is desirable. Thus, there is still a need for a flap system having the desirable features of the track guided flaps, while alleviating some of the difficulties associated with such track guided flaps.

To determine the sort of flap arrangement needed, consideration should be given to three basic mission requirements. First, there is the consideration of the length of the landing field and touch down speed limits of the airplane. This condition becomes the flap sizing criteria on short to medium range airplanes with high wing loading for operation from short runways, including short take-off and landing airplanes (i.e. STOL airplanes). The flap position for landing is the fully extended position for maximum lift coefficient.

The next consideration is the take-off field length limit. This influences the choice of flap assembly configuration particularly where there are high thrust to weight ratio airplanes with a requirement for very short take-off field length.

A third consideration is the one-engine-out second segment climb gradient. This condition will generally determine the flap configuration for take-off on twin and three engine airplanes with high wing loading. In order to achieve the minimum climb gradient with one engine failed, the airplane lift-to-drag ratio has to be optimized. High lift-to-drag ratios can be achieved with high Fowler motion at low flap angles. Since the flap setting for take-off and second segment climb is usually the same, the take-off flap setting is influenced by both take-off field length (the second consideration noted above) and second segment climb gradient.

With regard to the flap motion from stowed to fully deployed position, there are of course a variety of mechanisms in the prior art. As long as the intermediate flap positions are not critical, the criteria for selecting the mechanism are generally simplicity (with low cost and low risk), low load (low weight) and small size (with the resulting low drag). However, where there are rather stringent requirements for take-off field length limit and also the one-engine-out second segment climb gradient, the intermediate positions of the flap are quite critical. Airplanes which are take-off climb gradient critical need a flap system that provides very high Fowler motion at low flap angles, with most of the flap rotation occurring toward the end of deployment of the flap.

Thus, consideration as been given to achieving a flap assembly configuration which provides adequate Fowler motion with relatively small flap deflection, while requiring only a small flap support fairing with low cruise drag. It is an object of the present invention to provide such a flap assembly, with a desirable mix of advantageous features such as those discussed above.

In U.S. Pat. No. 4,434,959, which patent issued Mar. 6, 1984, naming myself as the sole inventor, there is disclosed a flap assembly which was designed to accomplish the objectives noted above. Since originating the design disclosed in said patent, I have done further development work to optimize the design. The details of these further developments are described below.

SUMMARY OF THE INVENTION

The flap assembly of the present invention is for an airfoil having a forward end, a rear end, a longitudinal axis, and a transverse axis. The flap assembly comprises a mounting structure located at the rear end of the airfoil. The mounting structure has first and second track mounting portions at transversely spaced first and second track mounting locations.

There is a flap member having a stowed first position at the rear end of the airfoil, with the flap member being movable rearwardly through an intermediate second position to a fully extended third position. The flap member has mounted thereto first and second substantially longitudinally aligned track members operatively connected to the first and second track mounting portion for longitudinal and rotational movement relative thereto. Each track member has a forward end and a rear end. The track members are characterized in that with the flap member in the first position, the rear end of each track member is at its related track mounting location. With the flap member in its third position, the forward end of each track member is at its related track mounting location.

There is actuating means operatively connected to the flap member and arranged to move the flap member substantially longitudinally between the first and second positions with relatively less rotational movement of the flap member so as to cause substantial Fowler motion of the flap member. The actuating means is further arranged to move the flap member between the second and third positions with relatively greater downward rotational movement of the flap member in a manner to cause relatively less Fowler motion.

The flap member has a first forward connecting member and a second rear connecting member connecting the flap member to the first track member at first and second connecting locations, respectively. The flap member also has a third forward connecting member and a fourth rear connecting member, connecting the flap member to the second track member at third and fourth connecting locations, respectively.

In a preferred embodiment, the first and third connecting members are arranged to permit relative rotational movement between the flap member and the first and second track members at the first and third connecting locations, respectively. Further, the second and fourth connecting members are arranged to permit relative rotational movement and also relative transverse movement between the flap member and the first and second track members at the second and fourth connecting locations, respectively.

In one version, the third connecting member permits relative transverse movement between the flap member and the second track member at the third connecting location.

In a preferred form, the third and fourth connecting members comprise third and fourth link means, respectively. Each link means has a lengthwise axis, and each of the link means has first and second pivotal connecting points defining its related lengthwise axis. The first connecting point of the related link means pivotally connects the related link means to the second track member, and the second connecting point of each link means pivotally connects the related link means to the flap member.

In a preferred embodiment, the third and fourth link means have the lengthwise axes thereof slanted relative to one another. Preferably, the relative direction of slant is generally parallel with the longitudinal axis, so that relative forward and rear movement of the flap member relative to the second track member is resisted by the third and fourth link means.

In another preferred embodiment, the first and third connecting members comprise first and third ball joint means, respectively. Each of the ball joint means permits relative pivotal movement, while restraining relative linear movement.

In the preferred form, the actuating means comprises first and second drive link means. Each drive link means has a first end mounted for rotation about a related generally transverse axis of rotation, and a second end which rotates about its related transverse axis of rotation and is operatively connected to said flap member so as to cause movement of the flap member. The first and second transverse axes of rotation are substantially perpendicular to direction of movement of the flap member between its first, second and third positions.

In a particular form shown herein, the flap assembly is mounted to a swept airfoil, and the first and second axes of rotation are spaced longitudinally relative to one another. Also, in the preferred form, there is a torque tube having first and second ends connected to the first and second drive link means, respectively. The torque tube is connected in a manner that it transmits torque between the first and second drive link means, while being able to maintain an angled position relative to the first and second drive link means. The connection of the torque tube to the second drive link means is in one form by a homo-kinetic joint, and in another form, by a universal connection.

Further, there are first and second linear actuators operatively connected to, respectively, the first and second drive link means. Each of the first and second linear actuators are driven independently of one another so as to provide dual redundancy of the actuating means.

In a further preferred embodiment, the first and second track members each have a longitudinal center axis, and the first and second track mounting portions are positioned generally in alignment with the longitudinal axis of its related track member. Thus, relative rotational movement of the first and second track members is about locations generally coinciding with the longitudinal axes of the first and second track members. Preferably, the first and second track mounting portions each comprise roller mounting means.

In another preferred form, the flap member has an exterior surface defining an airfoil section of the flap member. The first and second track members are positioned in transverse alignment at least partially within said airfoil section. The first and second track members are positioned transversely outside of said flap member and on opposite sides thereof, whereby intrusion of said first and second track members into surface contours of said flap member is avoided.

Other features of the present invention will become apparent from the following detailed description.

BRIEF DESCRIPTION OF THE DRAWING

FIG. 1 is a sectional view of a first embodiment of the flap assembly of the present invention, taken along a chordwise axis of the airfoil to which it is mounted;

FIG. 2 is a sectional view similar to FIG. 1, but showing a second embodiment of the present invention;

FIG. 6 is a sectional view taken along the chordwise axis, showing a forth embodiment of the present invention, with the flap assembly being shown in full lines in its cruise configuration;

FIGS. 7, 8 and 9 are three sectional views of a modified flap assembly generally the same as that shown in FIG. 6, and with the flap assembly shown in the cruise configuration in FIG. 7, in the take-off configuration in FIG. 8, and in the landing configuration in FIG. 9;

FIG. 13 is a sectional view, taken along line 13—13 of FIG. 2, and showing the sixth embodiment of the present invention somewhat schematically;

FIG. 14 is a sectional view taken along line 14—14 of FIG. 13; and

FIG. 15 is a further sectional view taken along line 15—15 of FIG. 12, with the flap assembly in its fully deployed landing position.

DESCRIPTION OF THE PREFERRED EMBODIMENTS

Figure 3:
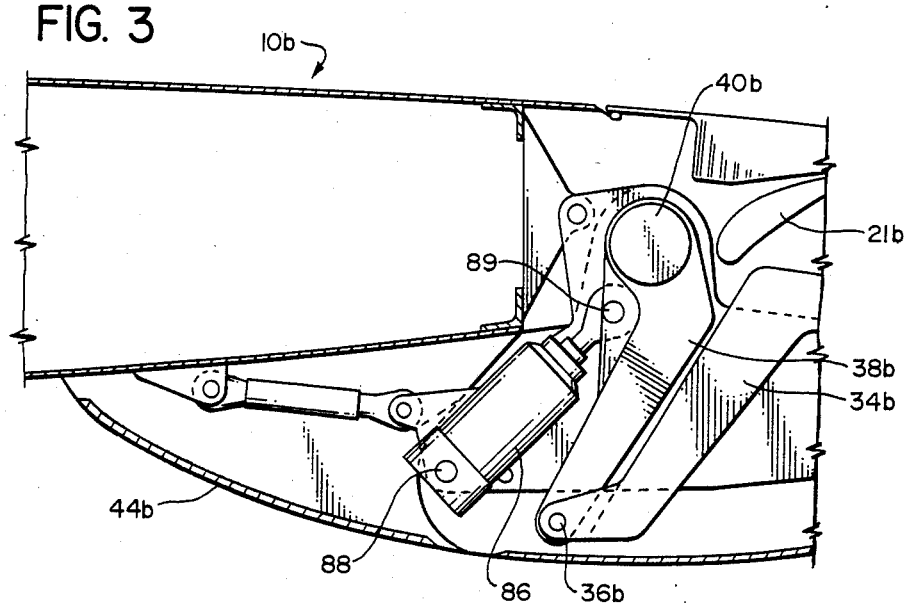
FIG. 3 is a sectional view, taken along a chordwise axis, of the forward actuating portion of a third embodiment of the present invention.

It is believed that a clearer understanding of the present invention will be achieved by first describing generally those components of the first embodiment of FIG. 1 which are substantially the same as corresponding components described in my issued patent, U.S. Pat. No. 4,434,959. Then, there will be a more detailed description of the novel features of the present invention.

FIG. 1 shows the embodiment of the present invention. There is an airplane wing 10 having an upper surface 12, a lower surface 14, a trailing edge portion 16, and a leading edge (not shown in the drawing for convenience of illustration). There is a flap assembly 18 which comprises a main flap member 20 having a stowed position in the trailing edge wing portion 16 (as shown in FIG. 1), and movable through an intermediate take-off position to a fully deployed landing position. Mounted to the flap member 20 at a location forwardly thereof is a vane 21.

Extending rearwardly from the lower edge of the wing 10 and positioned moderately below the chordwise or longitudinal axis of the wing 10 is a mounting structure 22. With the flap member 20 in its stowed position, the mounting structure 22 is positioned directly below the flap member 20.

The flap member 20 is connected to the mounting structure 22 by means of a track assembly 24. This track assembly 24 comprises a slide block 26 that is pivotally mounted at 28 to the rear end of the mounting structure 22. The assembly 24 further comprises a track member 30 that is rigidly connected to a flap carriage beam 32 to which the flap member 20 is mounted. The track member 30 engages the slide block 26 for slide movement with respect to the slide block 26 along the lengthwise axis of the track member 30. It is to be understood that the slide block 26 could be replaced by a roller carriage with a multitude of rollers in line, or some other roller device which would permit such relative movement between the track member 30 and the slide block 26.

Thus, the term "slide block" or "slide means" is used in its broader sense to include such roller members or other devices which permit such relative motion. In the particular form shown in FIG. 1, the pivot connection 28 of the slide block 26 can be, for example, a monoball joint.

Extending downwardly and moderately forwardly from the forward end of the flap carriage beam 32 is a mounting arm 34 which is pivotally connected at its forward end at 36 to a drive link 38. The drive link 38 is in turn rigidly connected to a rotary hinge 40.

Mounting structure 22, flap carriage beam 32, mounting arm 34, drive link 38 and their associated components are enclosed in a fairing 42 comprising a forward fixed fairing portion 44 and a rear movable fairing portion 46. The movable fairing portion 46 is connected at its rear end by a link 48 to the rear end of the flap carriage beam 32. The movable fairing portion 46 is mounted for pivotal movement at its forward end to a pivot joint 47 on the forward end of the mounting structure 22. When the flap member 20 is moved rearwardly, the link 48 moves the rear fairing portion 46 downwardly along a path indicated at 50 (i.e. this path 50 being the pivot connection 52 of the lower rear end of the link 48 with the movable fairing portion 46).

When the flap assembly 18 is in the stowed position of FIG. 1, the flap member 20 is positioned with the flap leading edge 56 located a moderate distance behind the trailing edge portion of the main part of the wing 10. The vane 21, mounted to the main flap member 20 by means of multiple spanwise struts 57, is positioned more closely to the trailing edge 16 and is positioned just rearwardly of the rotary hinge 40. In this position, the forward portion of the upper flap surface 58 is concealed in the aft portion of the wing structure 10. As shown herein, there is a spoiler 60 extending rearwardly from the upper wing surface 12 and positioned over the flap member 20 in the stowed position. The rear end of the spoiler 60 blends into the middle portion of the upper flap surface 58 so that only the rear portion of the upper flap surface 58 is exposed to the main airstream when the flap assembly 18 is in the stowed position.

Also, in the stowed position of FIG. 1, the drive link 38 extends radially from the center of rotation of the rotary hinge 40 downwardly and moderately forwardly, so that the connecting location of the drive link 38 (i.e. the pivot connection 36) is below and forward of the center of rotation of the rotary hinge 40. Further, the flap member 20 is positioned so that the slide block 26 is at the rear end 61 of the track member 30. In this position, the slide block 26 is moderately below the center portion of the flap member 20.

In the stowed position of FIG. 1, the components of the flap assembly 18 are stowed in a comparatively compact area so that the fairing 42 can in turn be rather compact so as to create little drag. More specifically, the portion of the flap assembly that extends below the lower wing surface 14 has relatively small depth, which in turn necessitates only a relatively small depth for the fairing 42. In the embodiments which are described later herein, the configuration is such so that the fairing 42 can be made yet smaller than what is shown in the first embodiment of FIG. 1.

To move the flap member 20 and its vane 21 rearwardly, the rotary hinge 40 is rotated in a counterclockwise direction (as seen in FIG. 1) so that the initial movement of the connecting location 36 of the drive link 38 is an arcuate path that is mostly rearwardly with a small downward component. Also, the motion of the flap member relative to the location of the slide block 26 is primarily rearwardly with a small downward component, since in the position of FIG. 1, the track member 30 slants rearwardly and moderately downwardly. The effect is that the initial rearward movement of the flap member 20 is such that the forward end of the flap member 20 moves downwardly slightly so that the upper surface 58 of the flap member 20 separates from the spoiler 60. For convenience of illustration, the flap assembly of FIG. 1 is shown only in its stowed position. Reference should be made to FIGS. 7-9, which illustrate a fourth embodiment, for illustration of the flap location for movement from the stowed configuration to the take-off position, and to the landing position.

With further rotation of the drive link 38, the arcuate path of the connecting location 36 begins to turn in a moderately upward direction, with the flap 20 sliding rearwardly and moderately downwardly at the location of the slide block 26, so that the main flap member 20 begins to rotate moderately in a clockwise direction (as seen in FIG. 1). When the flap member 20 reaches the position of a 10° flap setting, with almost ⅔ of the rotation of the actuating arm 38, the vane 21 rexains adjacent to the spoiler 60, with the vane 21 forming a slot with the flap member 20. Further counterclockwise rotation of the rotary hinge 40 causes the flap member 20 to rotate further downwardly to its fully deployed position for landing, and the vane 21 moves away from the spoiler 60 so as to define with the spoiler 60 a second slot.

The components 10-60 which have been described thus far are substantially similar to corresponding components described in my issued patent, U.S. Pat. No. 4,434,959. There will now be a description of the novel components of the present invention.

The mounting structure 22, track assembly 24 (including the slide block 26 and the track member 30), the flap carriage beam 32, the mounting arm 34 and the drive link 38 form a single actuating unit, generally designated 62. One such actuating unit 62 is located at an inboard location of the flap member 22, while a second such actuating unit 62 is located at an outboard location of the main flap member 20. There are two factors which create specific design problems relative to these actuating units 62. First, there is the problem of the deflection of the wing 10 under loading. Particularly, when the flap member 20 is in its fully deployed landing position, the problems created by the deflection of the wing can be aggravated. Second, there is the consideration that the ideal motion of the flap member 20 moving to its deployed position is not uniform along the spanwise dimension of the flap 20. Rather, the movement of the flap 20 is desirably what might be termed more of a conical motion, in that the inboard end of the flap member 20 moves in a curved path through a greater lineal distance than the corresponding movement of the spanwise outer portion of the flap member 20. The mounting of the main flap member 20 in accordance with the present invention is arranged to alleviate these problems.

The lower forward portion of the flap member 20 is connected by means of a ball joint 64 at approximately the middle portion of the flap carriage beam 32. This permits limited relative rotation of the flap member 20 about the center of the ball joint 64 about substantially all axes passing through the center of the ball joint 64. However, the ball joint connection 64 resists side loads exerted between the flap member 20, as well as resisting vertical and chordwise loading.

The lower part of the rear middle portion of the flap member 20 is connected to a rear end bracket 66 connected to the rear end of the carriage beam 32. This connection is through a link 68 which is vertically aligned (or in some configurations, moderately slanted) and which has a first ball joint connection at 70 to the bracket 66 and a second upper ball joint connection at 72 to the lower side of the flap member 20. Thus, the link 68 resists loads generally perpendicular to the plane occupied by the flap member 20, but permits limited movement in other directions.

As indicated previously, there are two such actuating units 62, one being at a more inboard location, and the other being at a more outboard location. The inboard actuating unit 62 has a drive link 38 which is moderately longer than the drive link 38 of the outboard actuating unit 62. Thus, for the same increment of rotation of the rotary hinge 40 (which is rigidly connected to both drive links 38), the lineal travel of the pivot connection 36 of the inboard unit 62 is greater than that of the movement of the pivot connection 36 of the outboard unit 62. This causes relatively greater lineal travel of the inboard side of the flap member 20, thus producing the above-described conical motion of the flap member 20.

If the trailing edge assembly is mounted to a swept wing so that this assembly 20 slants rearwardly in an outboard direction, then the conical movement of the flap member 20, as described above, tends to align the flap member 20 in a less swept alignment (i.e. closer to being perpendicular to the lengthwise axis of the aircraft). To accommodate for this movement, the two track members 30 are arranged so that they diverge moderately from one another in a rearward direction.

When the flap member 20 is in its fully deployed position, it has rotated rearwardly and downwardly so that the location of the link 68 is below the horizontal level of the wing 10. Thus, any upward deflection of the wing 10 would, in a sense, tend to elongate the downwardly extending rear portion of the flap member 20 (on the assumption that the flap member 20 had a rigid connection with the wing 10). However, since the two links 68 of the two actuating units 62 permit relative lateral movement between the mounting bracket 66 and the flap member 20, there is compensation for the extension due to the upward deflection of the wing 10.

A second embodiment of the present invention is illustrated in FIG. 2. Components of this second embodiment which are substantially the same as those of the first embodiment are given like numerical designations, with an "a" suffix distinguishing those of the second embodiment.

FIG. 2, which shows the second embodiment, illustrates the outboard actuating unit 62a. *(In the second embodiment, the inboard actuating unit 62a is substantially the same as the first embodiment illustrated in FIG. 1.)* The outboard actuating unit 62a differs from the unit 62 described with reference to FIG. 1 in that the ball joint 64 is eliminated, and this is replaced by a link 74 having an upper ball joint connection 76 and a lower ball joint connection 78. The alignment of this link 74 is slanted from the vertical in an upward and rearward direction, with the rear link 68a being substantially vertical (i.e. substantially perpendicular to the plane occupied by the flap member 20). Thus, with the two links 74 and 68 being angled relative to one another, and with the inboard actuating unit 62a (not shown) having a ball joint connection at its forward connecting location (not shown), the forward and rearward movement of the outboard portion of the flap member 20 is restrained. Yet, both of the links 74 and 68a permit relative lateral movement between the flap 20a and the related track member 30a so as to accommodate any relative movement therebetween due to deflection of the wing 10a.

Figure 4:
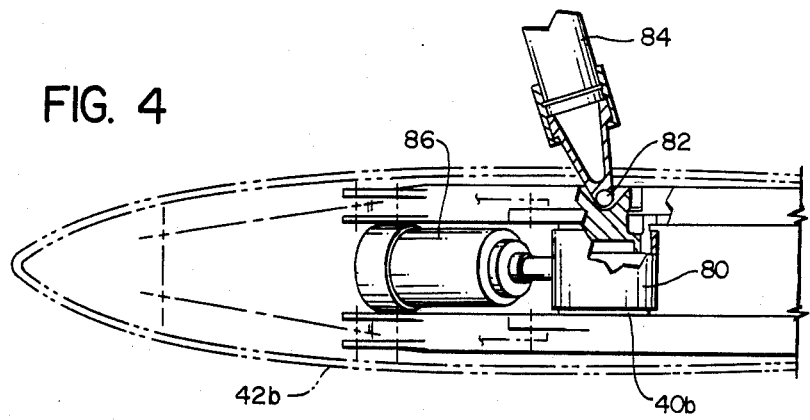
FIG. 4 is a top plan view of the actuating apparatus of FIG. 3.
Figure 5:
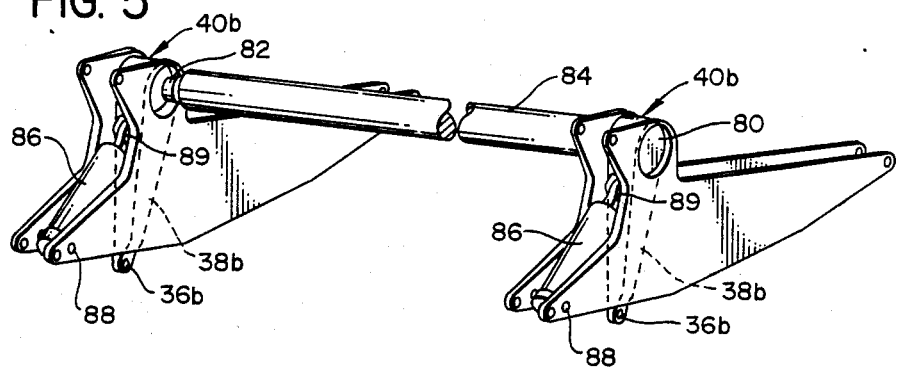
FIG. 5 is an isometric view illustrating more completely the actuating apparatus illustrated in FIGS. 3 and 4.

A third embodiment of the present invention is illustrated in FIGS. 3, 4 and 5. Components of this third embodiment which are similar to corresponding components of the first embodiment will be given a like numerical designation, with a "b" suffix distinguishing those of the third embodiment.

This third embodixent differs from the first two embodiments only in the manner in which the rotary hinge 40b is actuated. Accordingly, only this forward actuating portion is illustrated in FIGS. 3 and 4.

There is shown the forward mounting arm 34b pivotally connected at 36b to the drive link 38b, which is in turn connected to the rotary hinge 40b. The rotary hinge 40b comprises two rotatable end members 80 each fixedly connected to a related drive link 38b. These two end members 80 are connected through respective universal or homo-kinetic joints to opposite ends of a torque tube 84. FIG. 4 shows universal joints, and FIG. 5 shows homo-kinetic joints, with either form of the joint being acceptable. These homo-kinetic joints 82 are arranged to permit pivotal movement between the torque tube 84 and the end members 80, but rotational motion of the torque tube 84 about its lengthwise axis causes a corresponding rotation of the end member 80, and in like manner, rotation of the end member 80 causes a corresponding rotation of the torque tube 84 about its lengthwise center axis.

The axes of rotation of the two end members 80 are perpendicular to the alignment of the related track member 30. Thus, there is no "skewing" or side motion of the drive links 38b relative to the other components.

To drive the rotary hinge 40b, there are provided two separate linear hydraulic actuators 86 pivotally mounted at 88 at a lower forward location, and extending upwardly and rearwardly to connect at 89 to a related drive link 38b a short distance beneath its center of rotation. The movement of the two actuators 86 is synchronized so that power is transmitted substantially equally to the two drive links 38b. However, in the event that one of the actuators 86 malfunctions, the other of the actuators 86 still is able to cause rotation of both of the drive links 38b because of the interconnection of the torque tube 84 and the two homo-kinetic joints 82. Thus, there is provided redundancy in the power actuation, by reason of each of the actuators 86 being able to cause rotation of both of the drive links 38b.

A fourth embodiment of the present invention is illustrated in FIG. 6. Components of this fourth embodiment which are similar to corresponding components of the earlier embodiments will be given like numerical designations with a "c" suffix distinguishing those of the fourth embodiment. This fourth embodirent is substantially similar to the first embodiment except that the slide means is provided in the form of a pair of rollers 90. Further, the track member 30c is in the form of an I-beam having upper and lower flanges, with the center of rotation of the rollers 90 being coincident with the center axis 92 of the track 30c.

This arrangement enables the fairing 42c to be moved more closely to the lower wing surface 14c. The forward fairing portion 44c is pivotally mounted at a forward location 94, and has a spring mechanism 96 which urges the fairing portion 44c upwardly. The rear fairing section 46c is fixedly attached to the main flap member 20c.

In operation, the rotation of the drive link 38c causes the forward fairing portion 44c to deflect downwardly a short distance during deployment of the main flap member 20. In other respects, the operation of this fourth embodiment is substantially the same as that of the first embodiment.

FIGS. 7, 8 and 9 show a flap assembly quite similar to that shown in FIG. 6, with a few minor modifications. Accordingly, the same numerical designations with a "c" suffix have been used relative to the modified version shown in FIGS. 7, 8 and 9. These FIGS. 7–9 illustrate the location of the main flap 20c in three different locations. First, there is a cruise configuration of FIG. 7. Second, there is the take-off configuration of FIG. 8, where the single slot is formed between the main flap member 20c and the vane 21c. Third, there is the landing configuration of FIG. 9, where an additional slot is formed between the vane 21c and the spoiler 60c.

The modification of FIGS. 7–9 differs from the embodiment in FIG. 6 in that the forward fairing portion 44c' is a fixed fairing, rather than a movable fairing. In other respects, the function of this modified version shown in FIGS. 7–9 is generally the same as in the first embodiment of FIG. 1 and the third embodiment of FIG. 6.

Figures 10, 11, 12:
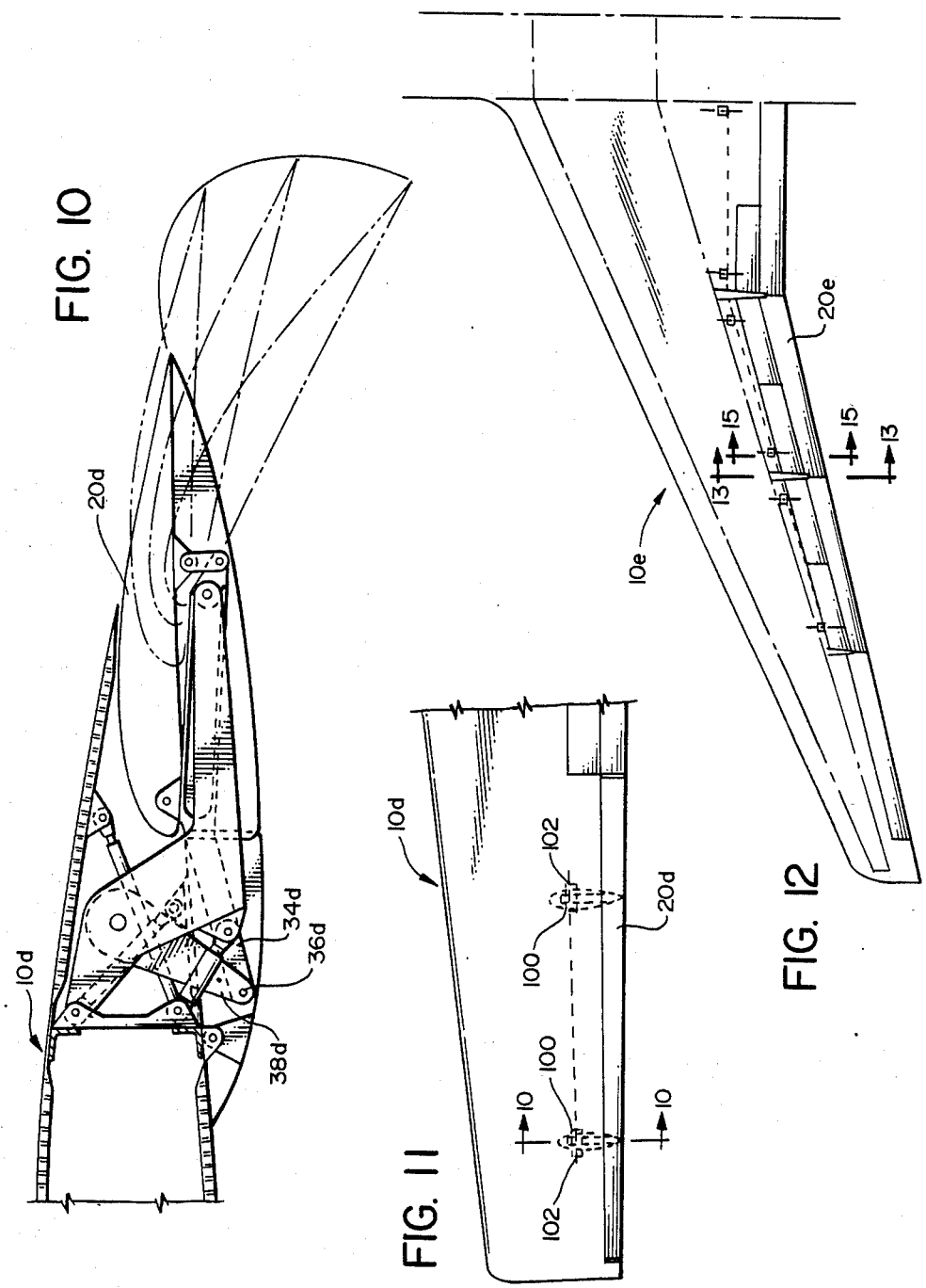
FIG. 10 is a sectional view, taken along the chordwise axis, of a fifth embodiment of the present invention in the form of a flaperon.
FIG. 11 is a top plan view of an outboard portion of the wing, incorporating the flaperon of FIG. 10.
FIG. 12 is a top plan view of a wing illustrating a sixth embodiment of the present invention.

A fifth embodiment of the present invention is illustrated in FIGS. 10 and 11. Components of this fifth embodiment which are similar to corresponding components of the other embodiments will be given like numerical designations, with a "d" suffix distinguishing those of the fifth embodiment.

The essential difference of the fifth embodiment is that the vane 21 that existed in the first and other embodiments is eliminated. The main flap member 20d is at an outboard location on the wing 10d, and this main flap member 20d is utilized as a flaperon. Actuation of the flaperons is not tied to the inboard flaps, but each flaperon has its own dual redundant actuation system with two rotary actutors 100 driven by two interconnected motors 102.

As illustrated in FIG. 10, the flap member 20d is shown in broken lines at various intermediate deflected positions. By moving the flap member 20d rearwardly to an intermediate position and then rotating it further upwardly or downwardly, the flap 20d (more precisely flaperon) can be used quite effectively for low speed roll control when right and left flaperons are moved in opposite directions. Further, with the flaperons 20d in the intermediate position, the flaperons 20d contribute lift out to the tips of the wing.

A sixth embodiment is illustrated in FIGS. 12, 13 14, 15. Components of this sixth embodiment which are similar to corresponding components of the other embodiments will be given like numerical designations, with an "e" suffix distinguishing those of the sixth embodiment.

In other embodiments, the track members were positioned at opposite end portions of the main flap member 20, but were spaced in a spanwise direction inwardly of the end edges of the flap member 20. However, in the present embodiment, the two track members 30e (and also the components immediately associated therewith) are positioned adjacent to and just outside of the two end portions of the main flap member 20e. With this arrangement, the two end track members 30e can be positioned within the actual contour of the airfoil section of the wing 10e and also that of the flap 20e. (This is illustrated in FIG. 13, which shows the flap 20e in its stowed position.) With the flap member 20e in its fully deployed position, as illustrated in FIG. 15, the track members 30e still remain within the contours of the airfoil section of the flap member 20e.

For ease of illustration, the detailed components of the actuating unit 62e are not shown. Rather, there is shown in FIG. 15 the drive link 38e engaging the mounting arm 34e. It is to be understood that other components would be utilized in generally the same manner as described with reference to the previous embodiments.

An examination of the sixth embodiment of FIGS. 12-15 makes it readily apparent that the depth of the actuating unit 62e can be made yet smaller than shown in the previous embodiments.

It is to be recognized that various modifications could be made to the embodiments shown herein without departing from the basic teachings of the present invention.

I claim:

1. A flap assembly for an airfoil having a forward end, a rear end, a longitudinal axis and a transverse axis, said flap assembly comprising:
   a. a mounting structure located at the rear end of the airfoil, said mounting structure having first and second track mounting portions at transversely spaced first and second track mounting locations;
   b. a first flap member having a stowed first position at the rear end of the airfoil, and movable rearwardly through an intermediate second position to a fully extended third position;
   c. said flap member having mounted thereto first and second substantially longitudinally aligned track members operatively connected to said first and second track mounting portions, for longitudinal and rotational movement relative thereto, each track member having a forward end and a rear end, said track members being characterized in that with the flap member in the first position, the rear end of each track member is at its related track mounting location, and with the flap member in its third position, the forward end of each track member is at its related track mounting location;
   d. actuating means operatively connected to said flap member and arranged to move said flap member substantially longitudinally between said first and second positions with relatively less rotational movement of the flap member so as to cause substantial Fowler motion of the flap member, and to move said flap member between said second and third positions positions with relatively greater downward rotational movement of the flap member in a manner to cause relatively less Fowler motion;
   e. said flap member having a first forward connecting member and a second rear connecting member, connecting said flap member to said first track member at first and second connecting locations, respectively, said flap member having a third forward connecting member and a fourth rear connecting member, connecting said flap member to said second track member at third and fourth connecting locations, respectively;
   f. said first and third connecting members being arranged to permit relative rotational movement between said flap member and said first and second track members at said first and third connecting locations, respectively, said second and fourth connecting members being arranged to permit relative rotational movement and also relative transverse movement between said flap member and said first and second track members at said second and fourth connecting locations, respectively.

2. The flap assembly as recited in claim 1, wherein said third connecting member permits relative transverse movement between said flap member and said second track member at said third connecting location.

3. The flap assembly as recited in claim 2, wherein said third and fourth connecting members comprise third and fourth link means, respectively, each link means having a lengthwise axis, each of said link means having first and second pivotal connecting points defining its related lengthwise axis, with the first connecting point of the related link means pivotally connecting the related link means to said second track member, and the second connecting point of each link means pivotally connecting the related link means to said flap member.

4. The flap assembly as recited in claim 3, wherein said third and fourth link means have the lengthwise axes thereof slanted relative to one another.

5. The flap assembly as recited in claim 4, wherein the lengthwise axes of the third and fourth link means are slanted relative to one another with a direction of slant being generally parallel with the longitudinal axis, whereby relative forward and rear movement of said flap member relative to said second track member is resisted by said third and fourth link means.

6. The flap assembly as recited in claim 1, wherein said first and third connecting members comprise first and third ball joint means, respectively, each of said ball joint means permitting relative pivotal movement, while restraining relative linear movement.

7. The flap assembly as recited in claim 6, wherein said second and fourth connecting members comprise second and fourth link means, respectively, each of said link means having first and second pivotal connecting points, with the first connecting point pivotally connecting the related link means to its related track member, and the second connecting point of each link means pivotally connecting the related link means to said flap member.

8. The flap assembly as recited in claim 1, wherein said actuating means comprises first and second drive link means, each drive link means having a first end mounted for rotation about a related generally transverse axis of rotation, and a second end which rotates about its related transverse axis of rotation and is operatively connected to said flap member so as to cause movement of said flap member, said first and second transverse axes of rotation each being substantially perpendicular to direction of movement of said flap member between its first, second and third positions.

9. The flap assembly as recited in claim 8, wherein said flap assembly is mounted to a swept airfoil, and said first and second transverse axes of rotation are spaced longitudinally relative to one another.

10. The flap assembly as recited in claim 9, wherein there is a torque tube having first and second ends connected to said first and second drive link means, respectively, said torque tube being connected in a manner that it transmits torque between said first and second drive link means, while being able to maintain an angled position relative to said first and second drive link means.

11. The flap assembly as recited in claim 10, wherein said torque tube is connected to at least one of said first and second drive link means by a homo-kinetic joint.

12. The flap assembly as recited in claim 10, wherein said torque tube is connected to at least one of said first and second drive link means by a universal connection.

13. The flap assembly as recited in claim 10, wherein there are first and second linear actuators operatively connected to, respectively, said first and second link drive means, each of said first and second linear actuators being driven independently of one another so as to provide dual redundancy of the actuating means.

14. The flap assembly as recited in claim 9, wherein there are first and second linear actuators operatively connected to, respectively, said first and second link drive means, each of said first and second linear actuators being driven independently of one another so as to provide dual redundancy of the actuating means.

15. The flap assembly as recited in claim 1, wherein said first and second track members each have a longitudinal center axis, and the first and second track mounting portions are positioned generally in alignment with the longitudinal axis of its related track member, whereby rotational movement of the first and second track members is about locations generally coinciding with the longitudinal axes of the first and second track members.

16. The flap assembly as recited in claim 15, wherein said first and second track mounting portions each comprise roller mounting means.

17. The flap assembly as recited in claim 1, wherein said flap member has an exterior surface defining an airfoil section of said flap member, said first and second track members being positioned in transverse alignment at least partially within said airfoil section, said first and second track members being positioned transversely outside of said flap member and on opposite sides thereof, whereby intrusion of said first and second track members into surface contours of said flap member is avoided.

18. A flap assembly for an airfoil having a forward end, a rear end, a longitudinal axis and a transverse axis, said flap assembly comprising:
 a. a mounting structure located at the rear end of the airfoil, said mounting structure having first and second track mounting portions at transversely spaced first and second track mounting locations;
 b. a first flap member having a stowed first position at the rear end of the airfoil, and movable rearwardly through an intermediate second position to a fully extended third position;
 c. said flap member having mounted thereto first and second substantially longitudinally aligned track members operatively connected to said first and second track mounting portions, for longitudinal and rotational movement relative thereto, each track member having a forward end and a rear end, said track members being characterized in that with the flap member in the first position, the rear end of each track member is at its related track mounting location, and with the flap member in its third position, the forward end of each track member is at its related track mounting location;
 d. actuating means operatively connected to said flap member and arranged to move said flap member substantially longitudinally between said first and second positions with relatively less rotational movement of the flap member so as to cause substantial Fowler motion of the flap member, and to move said flap member between said second and third positions positions with relatively greater downward rotational movement of the flap member in a manner to cause relatively less Fowler motion;
 e. said flap member having a first forward connecting member and a second rear connecting member, connecting said flap member to said first track member at first and second connecting locations, respectively, said flap member having a third forward connecting member and a fourth rear connecting member, connecting said flap member to said second track member at third and fourth connecting locations, respectively;
 f. said actuating means comprising first and second drive link means, each drive link means having a first end mounted for rotation about a related generally transverse axis of rotation, and a second end which rotates about its related transverse axis of rotation and is operatively connected to said flap member so as to cause movement of said flap member, said first and second transverse axes of rotation each being substantially perpendicular to direction of movement of said flap member between its first, second and third positions.

19. The flap assembly as recited in claim 18, wherein said flap assembly is mounted to a swept airfoil, and said first and second transverse axes of rotation are spaced longitudinally relative to one another.

20. The flap assembly as recited in claim 19, wherein there is a torque tube having first and second ends connected to said first and second drive link means, respectively, said torque tube being connected in a manner that it transmits torque between said first and second drive link means, while being able to maintain an angled position relative to said first and second drive link means.

21. The flap assembly as recited in claim 20, wherein said torque tube is connected to at least one of said first and second drive link means by a homo-kinetic joint.

22. The flap assembly as recited in claim 20, wherein said torque tube is connected to at least one of said first and second drive link means by a universal connection.

23. The flap assembly as recited in claim 20, wherein there are first and second linear actuators operatively connected to, respectively, said first and second link drive means, each of said first and second linear actuators being driven independently of one another so as to provide dual redundancy of the actuating means.

24. A flap assembly for an airfoil having a forward end, a rear end, a longitudinal axis and a transverse axis, said flap assembly comprising:
 a. a mounting structure located at the rear end of the airfoil, said mounting structure having first and second track mounting portions at transversely spaced first and second track mounting locations;
 b. a first flap member having a stowed first position at the rear end of the airfoil, and movable rearwardly through an intermediate second position to a fully extended third position;
 c. said flap member having mounted thereto first and second substantially longitudinally aligned track members operatively connected to said first and second track mounting portions, for longitudinal and rotational movement relative thereto, each track member having a forward end and a rear end, said track members being characterized in that with the flap member in the first position, the rear end of each track member is at its related track mounting location, and with the flap member in its third position, the forward end of each track member is at its related track mounting location;

d. actuating means operatively connected to said flap member and arranged to move said flap member substantially longitudinally between said first and second positions with relatively less rotational movement of the flap member so as to cause substantial Fowler motion of the flap member, and to move said flap member between said second and third positions positions with relatively greater downward rotational movement of the flap member in a manner to cause relatively less Fowler motion;

e. said flap member having a first forward connecting member and a second rear connecting member, connecting said flap member to said first track member at first and second connecting locations, respectively, said flap member having a third forward connecting member and a fourth rear connecting member, connecting said flap member to said second track member at third and fourth connecting locations, respectively;

f. said first and second track members each having a longitudinal center axis, and the first and second track mounting portions are positioned generally in alignment with the longitudinal axis of its related track member, whereby rotational movement of the first and second track members is about locations generally coinciding with the longitudinal axes of the first and second track members.

25. The flap assembly as recited in claim 24, wherein said first and second track mounting portions each comprise roller mounting means.

26. The flap assembly as recited in claim 24, wherein said flap member has an exterior surface defining an airfoil section of said flap member, said first and second track members being positioned in transverse said first and second flap members being positioned transversely outside of said flap member and on opposite sides thereof, whereby intrusion of said first and second track members into surface contours of said flap member is avoided.

27. A flaperon system for an airfoil having a forward end, a rear end, a longitudinal axis and a transverse axis, said system comprising:

a. a pair of flaperon assemblies mounted at opposite ends of the airfoil, each flaperon assembly comprising:

1. a mounting structure located at the rear end of the airfoil, said mounting structure having first and second track mounting portions at transversely spaced first and second track mounting locations;

2. a first flaperon member having a stowed first position at the rear end of the airfoil, and movable rearwardly through an intermediate second position to a fully extended third position;

3. said flaperon member having mounted thereto first and second substantially longitudinally aligned track members operatively connected to said first and second track mounting portions, for longitudinal and rotational movement relative thereto, each track member having a forward end and a rear end, said track members being characterized in that with the flaperon member in the first position, the rear end of each track member is at its related track mounting location, and with the flaperon member in its third position, the forward end of each track member is at its related track mounting location;

4. actuating means operatively connected to said flaperon member and arranged to move said flaperon member substantially longitudinally between said first and second positions with relatively less rotational movement of the flaperon member so as to cause substantial Fowler motion of the flaperon member, and to move said flaperon member between said second and third positions positions with relatively greater downward rotational movement of the flaperon member in a manner to cause relatively less Fowler motion;

5. said flaperon member having a first forward connecting member and a second rear connecting member, connecting said flaperon member to said first track member at first and second connecting locations, respectively, said flaperon member having a third forward connecting member and a fourth rear connecting member, connecting said flaperon member to said second track member at third and fourth connecting locations, respectively;

6. said actuating means comprising first and second drive link means, each drive link means having a first end mounted for rotation about a related generally transverse axis of rotation, and a second end which rotates about its related transverse axis of rotation and is operatively connected to said flaperon member so as to cause movement of said flaperon member, said first and second transverse axes of rotation each being substantially perpendicular to direction of movement of said flaperon member between its first, second and third positions;

b. each flaperon assembly having first and second independently operable motor means operatively connected to the first and second drive link means, respectively, with the two flaperon assemblies being independently operable in a manner to be able to be moved oppositely relative to one another.

28. The flaperon system as recited in claim 27, wherein the flaperon assemblies are mounted to a swept airfoil of each assembly, and said first and second transverse axes of rotation are spaced longitudinally relative to one another.

29. The flaperon system as recited in claim 28, wherein there is for each assembly a torque tube having first and second ends connected to said first and second drive link means of that assembly, respectively, said torque tube being connected in a manner that it transmits torque between said first and second drive link means, while being able to maintain an angled position relative to said first and second drive link means.

* * * * *